United States Patent
Asakura et al.

(10) Patent No.: US 10,195,529 B2
(45) Date of Patent: Feb. 5, 2019

(54) SYSTEMS AND METHODS OF PROVIDING EMERGENT INTERACTIONS IN VIRTUAL WORLDS

(71) Applicant: Nintendo Co., Ltd., Kyoto (JP)

(72) Inventors: Atsushi Asakura, Kyoto (JP); Takuhiro Dohta, Kyoto (JP); Yosuke Sakooka, Kyoto (JP); Takuma Deguchi, Kyoto (JP)

(73) Assignee: NINTENDO CO. LTD., Kyoto (JP)

( * ) Notice: Subject to any disclaimer, the term of this patent is extended or adjusted under 35 U.S.C. 154(b) by 0 days.

(21) Appl. No.: 15/620,265

(22) Filed: Jun. 12, 2017

(65) Prior Publication Data

US 2018/0353859 A1    Dec. 13, 2018

(51) Int. Cl.
| | | |
|---|---|---|
| A63F 9/00 | (2006.01) | |
| A63F 13/577 | (2014.01) | |
| G06T 11/60 | (2006.01) | |
| G06T 19/20 | (2011.01) | |
| A63F 13/52 | (2014.01) | |
| A63F 13/60 | (2014.01) | |
| A63F 13/837 | (2014.01) | |

(52) U.S. Cl.
CPC ............ *A63F 13/577* (2014.09); *A63F 13/52* (2014.09); *A63F 13/60* (2014.09); *A63F 13/837* (2014.09); *G06T 11/60* (2013.01); *G06T 19/20* (2013.01)

(58) Field of Classification Search
None
See application file for complete search history.

(56) References Cited

U.S. PATENT DOCUMENTS

| | | | | |
|---|---|---|---|---|
| 7,967,680 | B2* | 6/2011 | Yamada | A63F 13/10 463/31 |
| 2005/0170887 | A1* | 8/2005 | Fujii | A63F 13/10 463/31 |
| 2007/0167203 | A1* | 7/2007 | Yamada | A63F 13/10 463/7 |
| 2007/0197286 | A1* | 8/2007 | Shimizu | A63F 13/10 463/31 |
| 2016/0171835 | A1* | 6/2016 | Washington | G07F 17/3244 463/25 |
| 2016/0361641 | A1 | 12/2016 | Koizumi et al. | |

OTHER PUBLICATIONS

Nintendo, The Legend of Zelda: Skyward Sword, released Nov. 20, 2011, gameplay video found at https://www.youtube.com/watch?v=jORzX0Pct0U, Nov. 20, 2011.

(Continued)

*Primary Examiner* — Seng Heng Lim
(74) *Attorney, Agent, or Firm* — Nixon & Vanderhye P.C.

(57) ABSTRACT

A computer system is provided that stores data for a plurality of virtual objects and elements that are positioned within a virtual space. Each of the virtual objects can adopt different states depending on which elements are determined to have collided with the virtual objects. Once it is determined that an object is collided with an element a further determination is made as to whether that element effects the virtual object. If the element does affect the virtual object, then the state for that object is updated. Further, a new element is then generated based on this change in state of the virtual object.

20 Claims, 13 Drawing Sheets

(56) References Cited

OTHER PUBLICATIONS

Nintendo, The Legend of Zelda: Breath of the Wild, released Mar. 3, 2017, description of game at https://en.wikipedia.org/wiki/The_Legend_of_Zelda:_Breath_of_the_Wild, retrieved Jun. 11, 2017.
"Breaking Conventions with the Legend of Zelda: Breath of the Wild" Fujibayashi, H. et. al., Game Developer's Conference, https://www.youtube.com/watch?v=QyMsF31NdNc, Published Mar. 10, 2017.

* cited by examiner

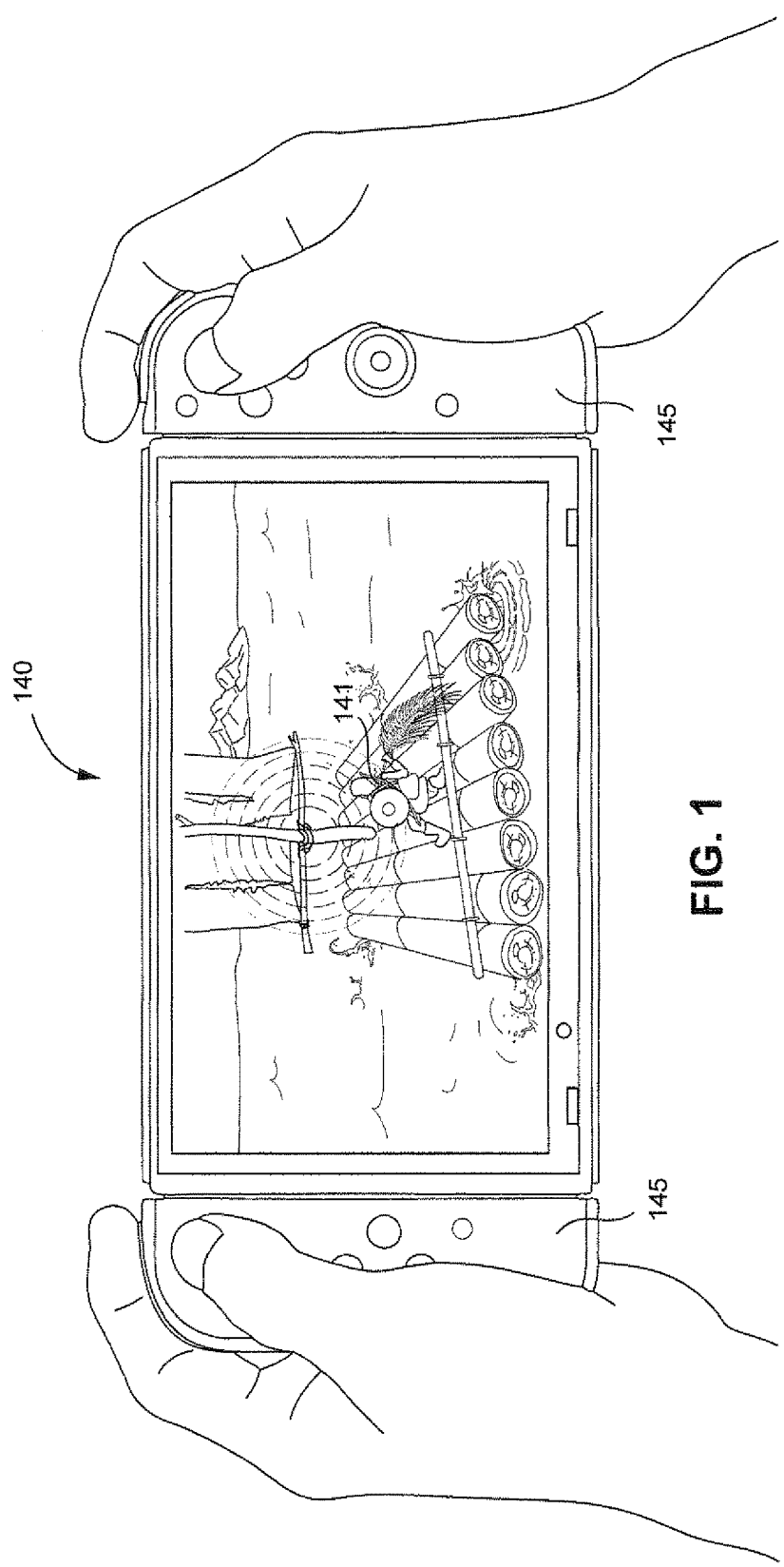

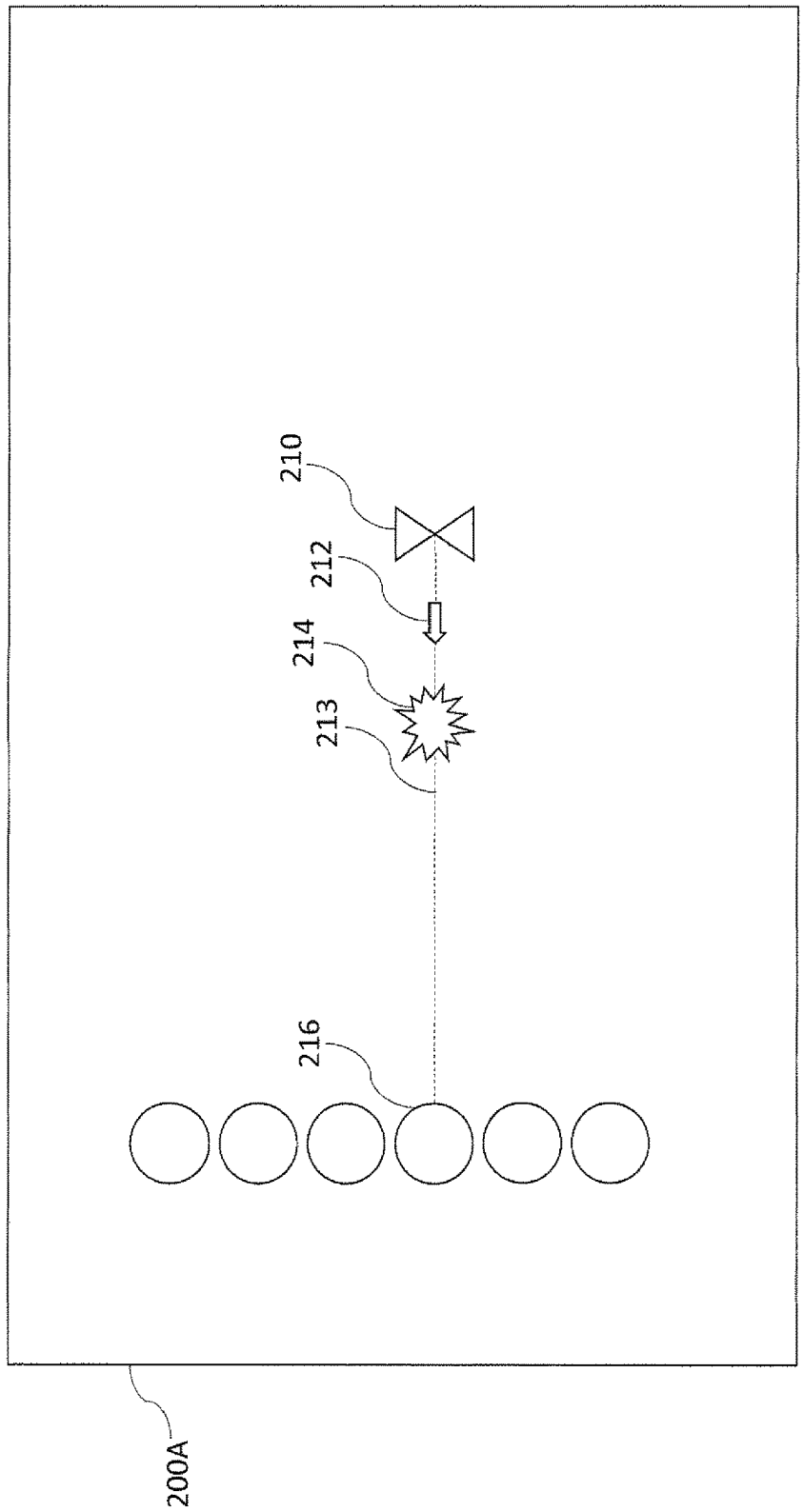

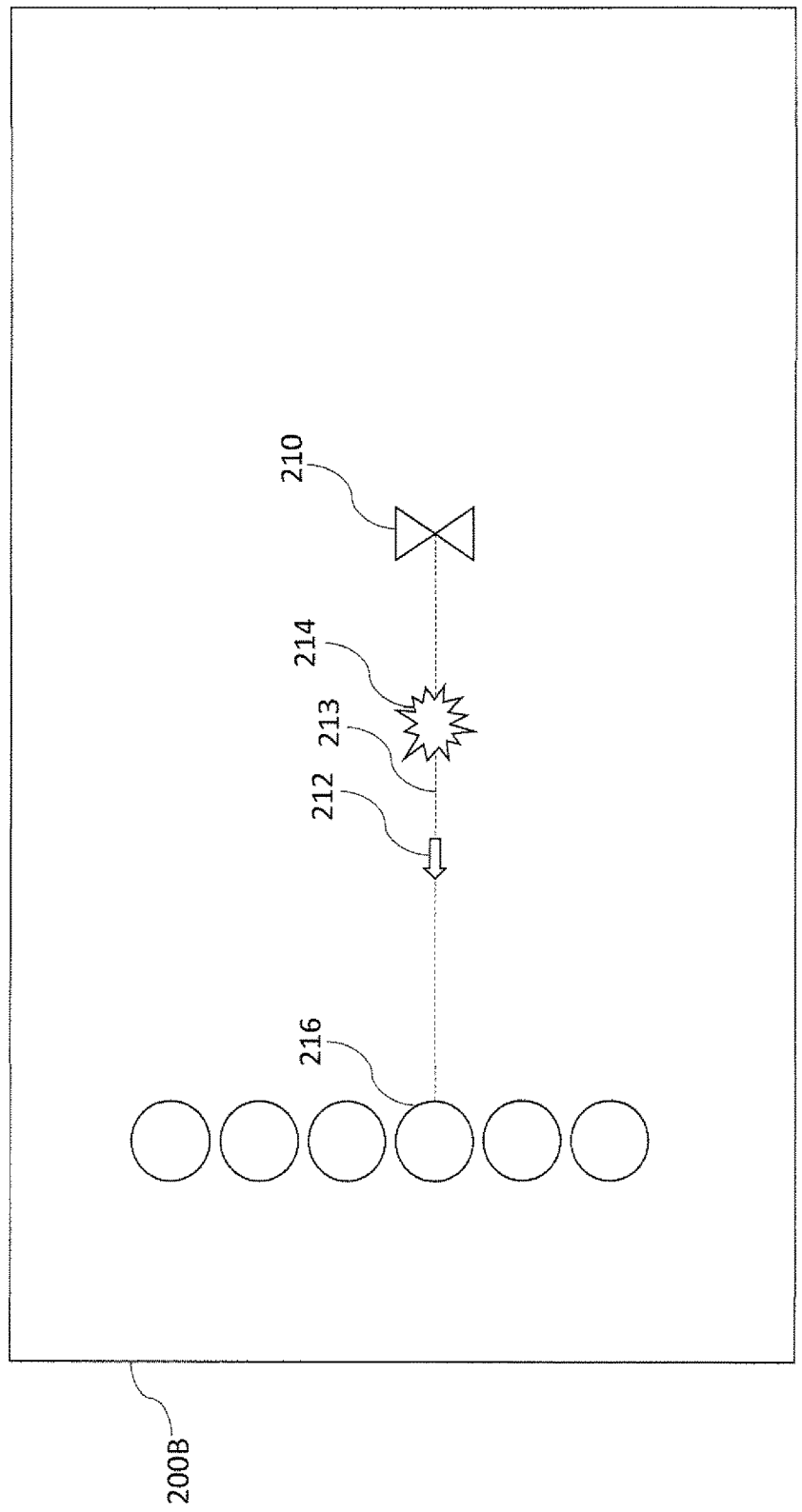

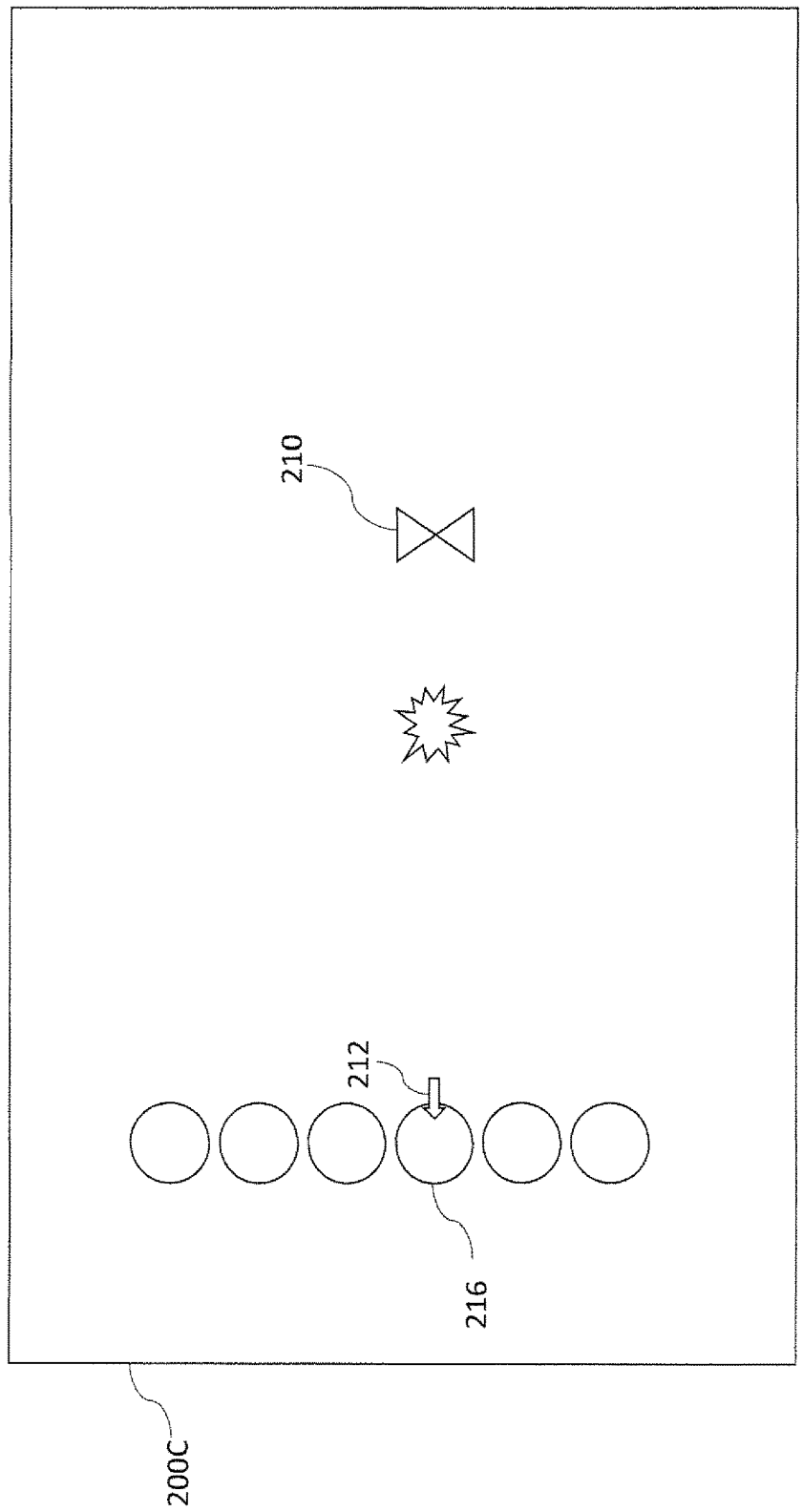

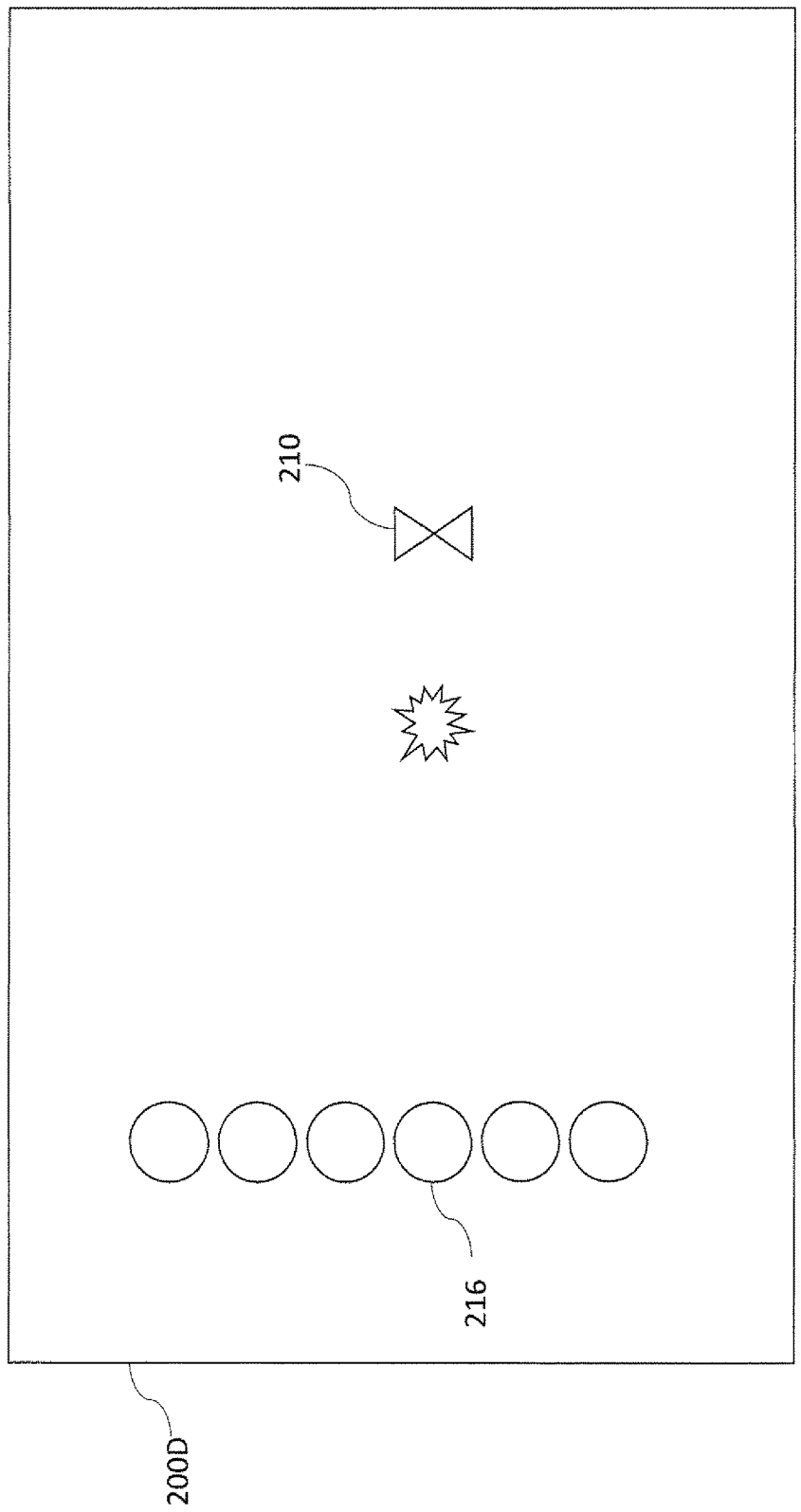

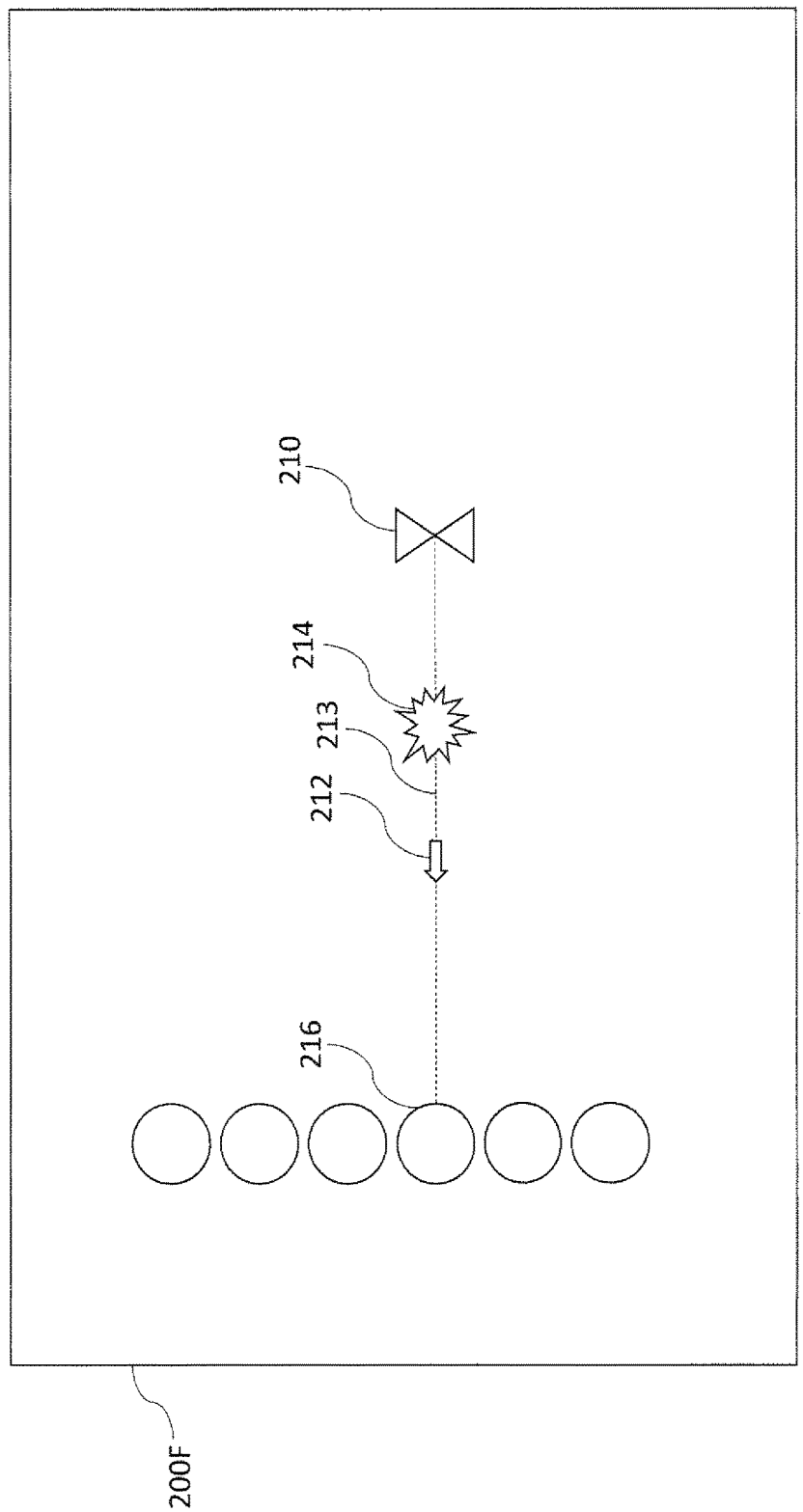

SYSTEMS AND METHODS OF PROVIDING EMERGENT INTERACTIONS IN VIRTUAL WORLDS

CROSS REFERENCE(S) TO RELATED APPLICATION(S)

The disclosure of U.S. Patent Publication No. 2016/0361641 is incorporated herein by reference.

TECHNICAL OVERVIEW

The technology described relates to creating virtual worlds. More particularly, the technology described herein relates systems and techniques for creating virtual worlds that support emergent interactions.

INTRODUCTION

Virtual worlds and spaces (whether two-dimensional or three-dimensional) are flexible and powerful tools that allow creators (e.g., architects, game designers, interior designers . . . ) to create a myriad of different virtual objects and systems. Architects can design buildings without having to pour a concrete foundation. Interior designers can place furniture into a virtual house without having to purchase (or move) the furniture. And game creators can provide game players with new experiences that range from playing a baseball game, to exploring a savanna full of prehistoric dinosaurs, to charting the reaches of outer space. While each of these applications may serve a different purpose, they all commonly require someone to create the "world".

Creation of virtual worlds can be a complex and time consuming process. In certain instances, such as an architectural application, the application may be designed to model how the "real world" operates as closely as possible. The application may include rules that model how physics operates in the "real world." Such rules may allow, for example, a user (e.g., an architect) to determine whether or not the designed building is physically possible.

Virtual worlds have also played an important role in the development of video games as they allow game creators the freedom to provide a seemingly endless variety of new worlds in which game players can explore and interact. But creation of such worlds can be a complex and time consuming task and can vary from creating vast preplanned storylines to creating detailed graphics that can look almost life-like. One technique that game creators use when creating virtual worlds is to provide systems and process within the game world that support so-called emergent interactions or emergent gameplay. One example is a physics engine or physics system that provides a "basic" (which may still be complex) set rules for how "physics" (e.g., collisions between virtual objects and how those objects move) operate with the virtual world. Game creators can also tailor such systems and provide "physics" that are different from the "real world" in order to provide for better gameplay experiences. Indeed, sometimes the "best" physics for a given game are those that can't exist in the "real world."

When such systems are provided in a virtual environment they provide a user with the tools to find a solution (and perhaps even the problem) rather than providing the player with a pre-set solution to a pre-set problem (e.g., one that is scripted or the like). Thus, new techniques for creating virtual worlds, along with the systems and processes that support such worlds, are continually sought after.

SUMMARY

In certain example embodiments, a virtual space includes virtual objects and elements. A computer system is programmed to define how these two virtual entities interact with each. Objects change their states based on interaction with elements (but not other objects) within the virtual space. Whether a given object is affected by a given element is based on the state of that object. The change in state of a virtual object is also based on a collision determination between the virtual object and other elements. Those objects that do change state can also generate elements within the virtual world depending on the state of the object.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 1 shows an example computer system displaying an image of a virtual world according to certain example embodiments;

FIGS. 2A-2H are example views of a virtual world according to certain example embodiments;

DETAILED DESCRIPTION

Figure 2E:
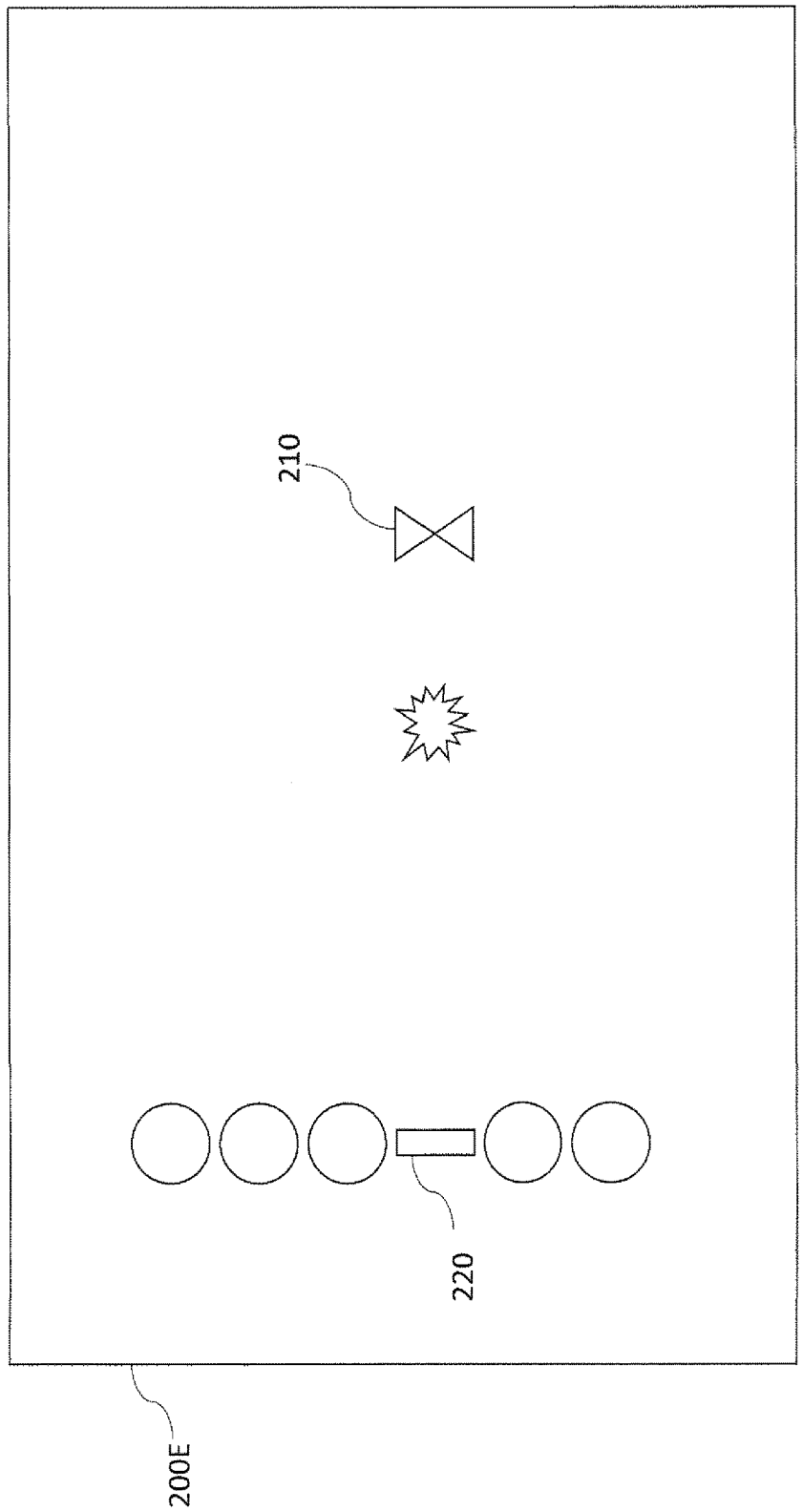

In the following description, for purposes of explanation and non-limitation, specific details are set forth, such as particular nodes, functional entities, techniques, protocols, etc. . . . in order to provide an understanding of the described technology. It will be apparent to one skilled in the art that other embodiments may be practiced apart from the specific details described below. In other instances, detailed descriptions of well-known methods, devices, techniques, etc. . . . are omitted so as not to obscure the description with unnecessary detail.

Sections are used in this Detailed Description in order to orient the reader as to the general subject matter of each section. As will be seen below, the description of many features spans multiple sections, and headings should not be read as affecting the meaning of the description included in any section.

Overview

In certain example embodiments, a computer system is provided and executes software to generate and maintain a virtual world (also referred as a game space, a virtual space, a game world, and the like herein). In certain examples, the generation and maintenance is handled by a game engine of a video game program. The game engine is programmed to track, locate, update, and otherwise control varies entities within the virtual world. Such control may include controlling the movement aspects of the entity and/or the state of that entity.

Entities can include those that hold a constant solid form within the virtual world and those that do not. In certain example embodiments, one type of entity is called an object (or virtual object) and another type of entity is called an element. Objects may be entities within the virtual world that hold a solid or constant form. Elements may be entities that are fluid, intangible, or otherwise do not hold a solid form with the virtual world.

In certain examples, the game engine (or other software) may be programmed to handle objects and elements according the following rules: 1) Elements can change the state of objects; but 2) Objects cannot change each other's states.

Thus, for example, based on a state of virtual object, a game engine may determine whether can be affected by an adjacent element—e.g., A bundle of wood in a "normal" state can burn, but that in a "wet" state cannot.

These techniques may thus allow objects that are placed into a virtual world to be used in ways that game designers may not expect—but in ways that may ultimately increase the enjoyment of a game.

In many places in this document, including but not limited to in the below descriptions of FIGS. 1-5, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 6.

Description of FIG. 1:

FIG. 1 illustrates an example screen of a computer system 140 displaying an image of a virtual space. The computer system show in FIG. 1 is an example of the computer system described in connection with FIG. 6. Computer system 140 executes an application program (such as a game application) where a user controls a player character 141 in a virtual space based on input provided by the user via input devices 145. Further discussion of example computer systems (also referred to as information processing devices or systems) are provided in U.S. Patent Publication No. 2016/0361641, which is incorporated herein by reference in its entirety.

Computer system 130 displays an image or a view of the virtual world. The image is generated using a virtual camera that images a portion of the virtual world. In this example, the virtual camera is positioned at a so-called third-person perspective that shows the controlled game character 141 (or a portion thereof). As the game character "moves" through the virtual space the position of the virtual camera is correspondingly updated. In certain examples, the virtual camera may be controllable by the user. For example, the user may adjust the position or orientation of the virtual cameras (e.g., its pose) to point to other locations of the virtual world. In certain examples, the virtual camera may be positioned at the eyes of the virtual character 141 (e.g., a so-called first person perspective).

In certain examples, a virtual world may be presented from an overhead view (e.g. as shown in FIGS. 2A-2H) that may either be an image of a three-dimensional virtual world from overhead (e.g., top-down) or may be a two-dimensional world. It will be thus be appreciated that different types of techniques for displaying views of a virtual world are contemplated using the techniques discussed herein.

In the example shown in FIG. 1, the game character 141 is holding a leafy branch (e.g., an object) that, based on input from the user, is used to generate wind (e.g., an element) or air that is then applied to the sail (e.g., an object) of the log raft. The log raft is the propelled through the virtual world. As discussed herein, the generation the "wind" is accomplished using techniques that: 1) control the state of objects within the virtual world; 2) control the state of elements within the virtual world; and 3) how elements may be generated.

Description of FIGS. 2A-2H:

FIGS. 2A-2H are example views (200A, 200B, 200C, 200D, 200E, 200F, 200G, 200H) of a virtual world according to certain example embodiments. In these views, a player character 210 is located within a virtual world. A user instructs the player character 210 to shoot an object 212 (e.g., an arrow) along trajectory line 213 towards object 216 (e.g., a tree object). Along the trajectory line of the object 212 is a fire element 214 (e.g., from a camp fire or the like). Thus, as the position of the object 212 is updated by a virtual world engine it will pass through a space (e.g., a collision area) of the fire element 214.

As described below, objects within the virtual world may be constructed out of one or more material types (or objects may have a given material type as a property of that object). Objects may also have different states. An example of how such state changes for objects (e.g., based on the material(s) that the object is made out of) is provided in connection with FIG. 3.

In the example in FIGS. 2A-2H the object 212 is initially shot by game character 210 and is a first state (e.g., a default state). However, when the object 212 comes into contact with the fire element 214, it changes to a second state—a burning state. The determination of how the object 212 changes states may thus be based on both the type of material (e.g., wood in this example) that makes up the object and the type of element (e.g., fire in this example) that the object interacts with.

In certain instances, some states of an object may cause the generation or emission of an element. As shown in FIG. 2B, once object 212 comes into contact with the camp fire 214 and its fire element, the arrow changes to a burning state. In this state, the arrow also begins to generate or emit a fire element. The space within the virtual world that this generated element occupies may be represented by a collision area (e.g., a sphere, bounding box, bounding area, etc. . . . ) Thus, objects with the virtual world that object 212 comes into contact with may now be influenced by the fire element being emitted by object 212.

This further reaction to the fire element is shown in FIG. 2C, where the arrow impacts with object 216 (a tree object). Object 216, like the arrow, is composed of a wood material and accordingly upon coming into contact with object 212 will cause object 216 to change from its initial default state (e.g., a regular tree) to a tree that is burning or on fire as shown in FIG. 2C. These reactions can continue in the virtual world as the burning tree 216 causes other nearby trees to catch fire (not shown).

In certain examples, the elapse of time may also cause objects to change state. As shown in FIG. 2D, after a predetermined amount of time has passed (e.g., 1 minute, or other length defined by a game world creator), object 216 changes to a burnt-out state. Further, once the object enters this state, it may be caused (e.g., by the chemistry engine) to change to a new object, such as the log 220. The triggering to a new object may occur after a predetermined amount of time has passed. In certain examples, when an object enters a certain state it may automatically cause the object to disappear and/or change into a new object. The newly created object (the log in FIG. 2E) for this transition may be considered a new object by the game engine—one that may be interacted with in different ways (compared to the original object) by the player character. For example, the player character may pick-up the log and use it as a weapon or may use the log for a camp fire at a later time. Also, like state changes for objects, when an object disappears and/or changes to a new object it may cause any elements that are being generated by that object to disappear.

Figure 2G:
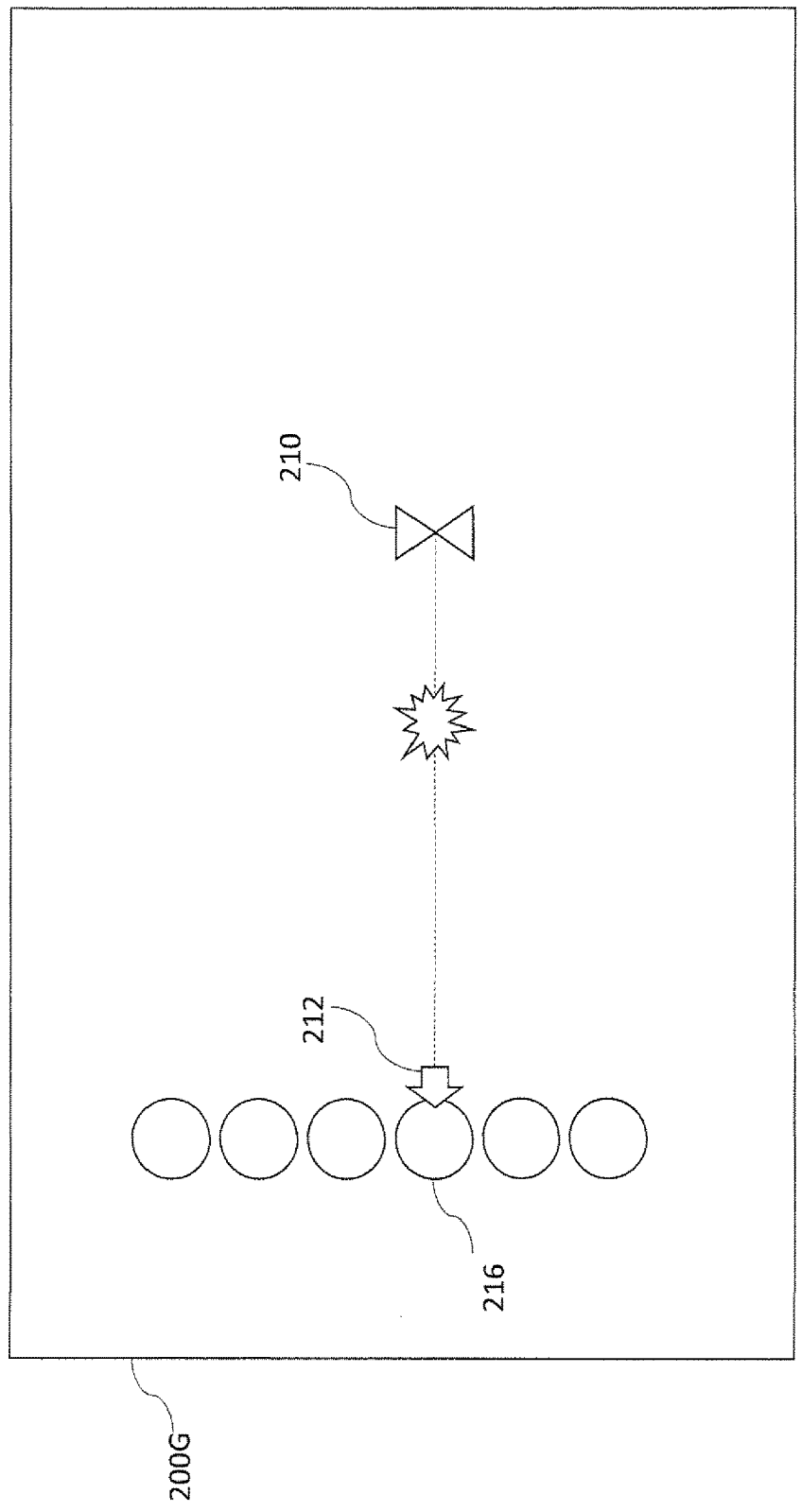
Figure 2H:
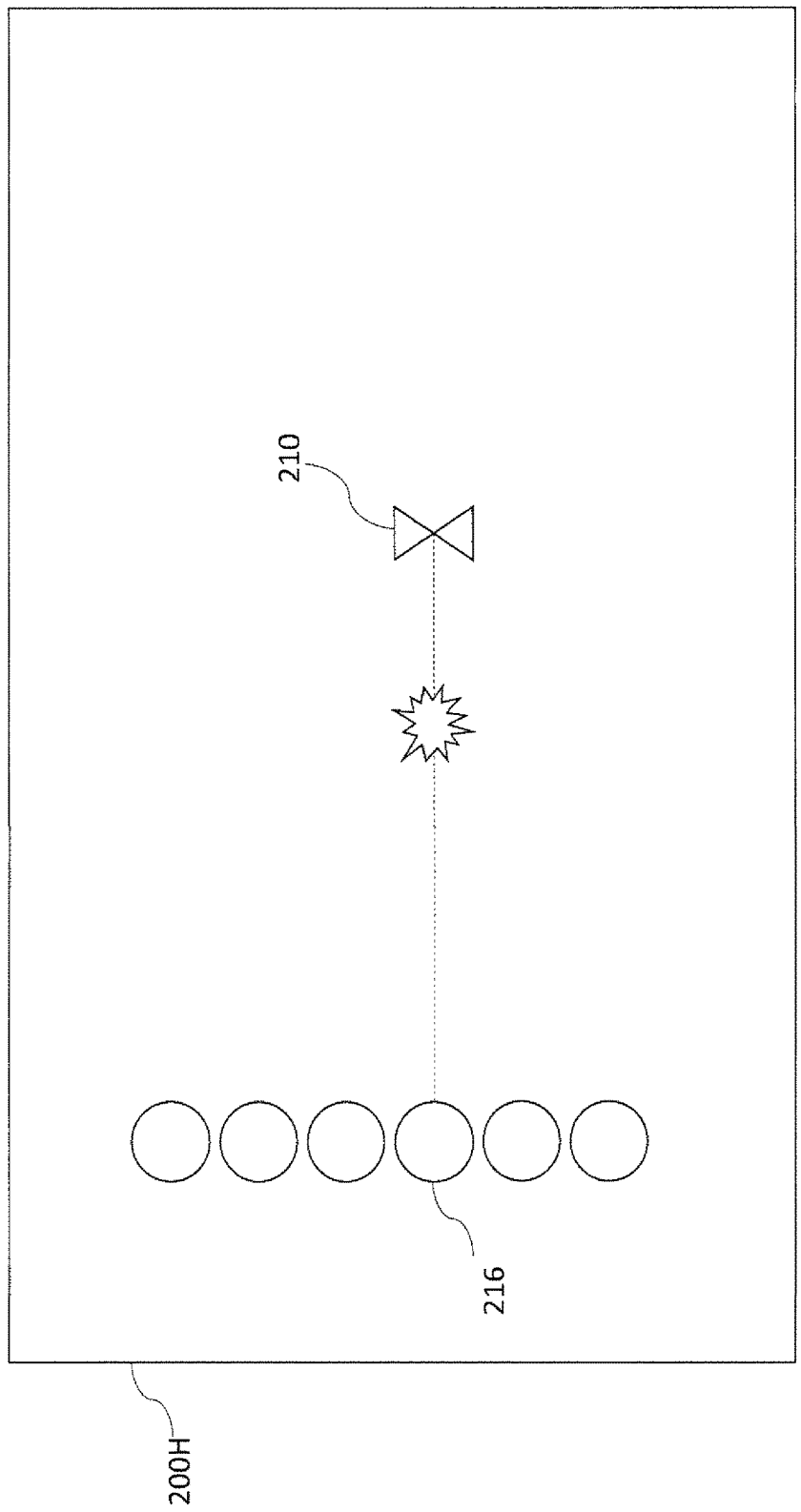

It will be appreciated that this type of interaction between the arrow and the fire element is not pre-scripted (e.g., such that a particular fire place can turn an arrow on fire). Rather, any object that is made out of a wood material in the virtual world can interact with any fire element in this manner. Further, the same objects (e.g., trees) may react differently when depending on the state of the object. An example of how the "same" tree object may react differently to a fire arrow is shown in FIGS. 2F-2H.

In FIG. 2F, as with the prior example, the arrow 212 passes through the fire element 214, changes to a burning state, and begins generating a fire element. However, in FIG. 2F, the tree object is in a "wet" state instead of a "normal" state. This may be due to, for example, rain being applied to the location of the tree in the virtual world.

Accordingly, when the arrow 212 impacts the tree object 216, the tree may not enter a burning state. Instead, the tree object 216 may change to its "normal" state. Also, as discussed herein, this change may not be immediate. For example, the change between the wet state and normal state may occur over a couple seconds, minutes, or other time period within the virtual space. Also, while the tree object is in the process of changing states, the fire arrow may similarly change its state to "burnt out" (e.g., going from a burning state to a burnt-out state). The results of the tree object and the arrow object changing states are shown in FIG. 2G. Like the burnt tree object in FIG. 2D, the arrow may change to a new object and/or disappear (e.g., be deleted from) the virtual space as shown in FIG. 2H.

As discussed herein in connection with certain example embodiments, objects do not affect each other states. It is because of this rule that the "wet" tree object does not affect the "burning" arrow object. In other words, the burning arrow object only affects the tree object because it is generating a fire element. Thus, certain types of states for objects may cause the generation of elements while others will not. And these generated elements by objects in certain states may thus affect the state of other objects.

The system that provides for handling these types of reactions between objects and elements may be described as a chemistry engine. Such a system may facilitate chain reactions within a virtual world because objects that change state change then generate further elements and objects react differently to the same element depending on their state. Thus, a user can encounter and interact with a virtual world in many different ways—some of which not even the original designer of the game world could have envisioned.

Figure 3:
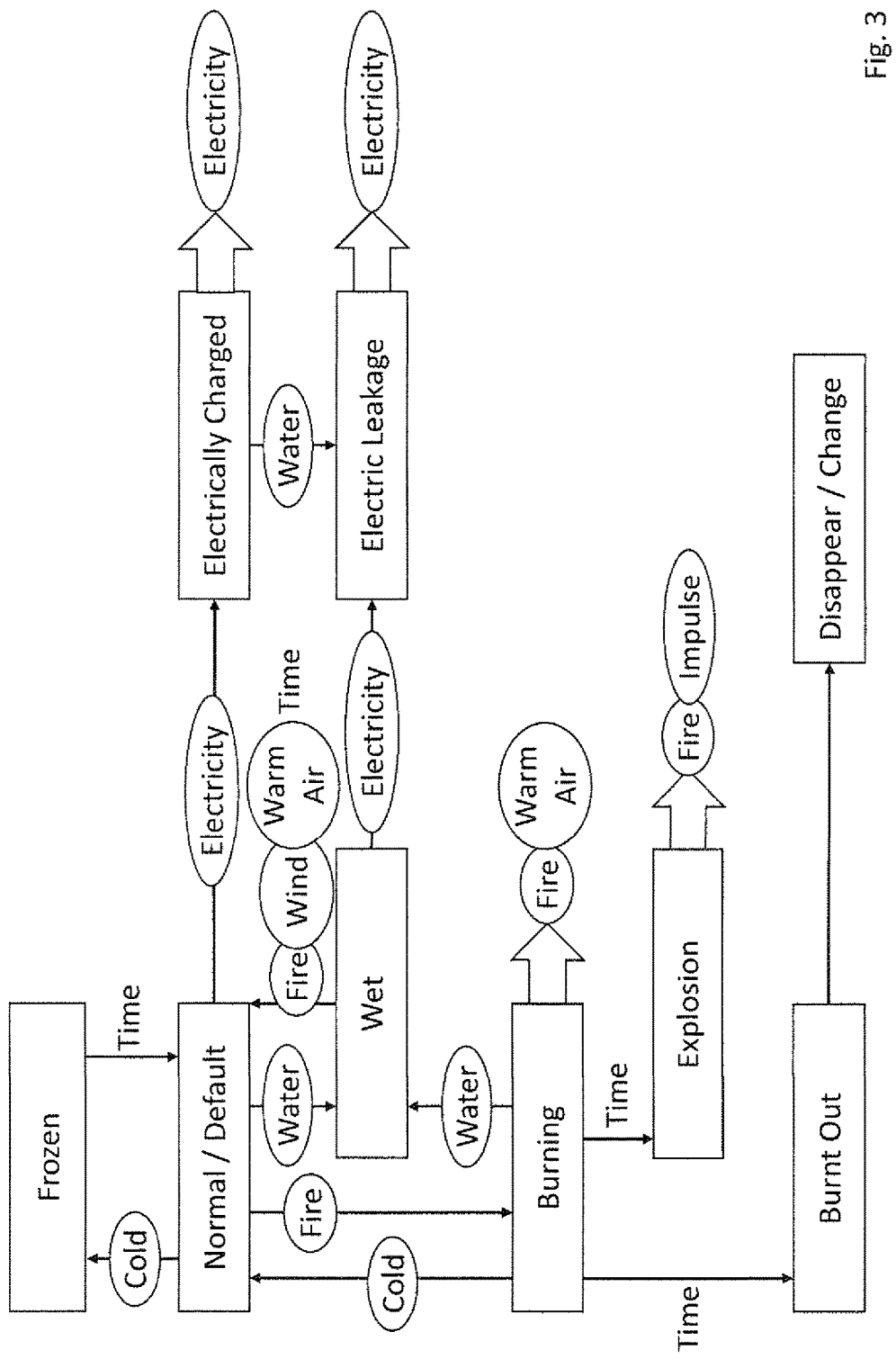
FIG. 3 is an example state diagram showing how an example material may change states based on interaction with elements of an example virtual world.

Description of FIG. 3:

FIG. 3 is an example state diagram showing how one or more example objects may change states based both the type of material(s) that those objects are made out of and the interaction of elements with those objects. In the state diagram of FIG. 3, ovals associated with directional arrows show how certain elements within the virtual world affect a given object that is in the indicated state. Objects may be composed of one or more of the following example materials: wood, metal, organisms (e.g., player and non-player characters), explosives (e.g., dynamite), concrete, stone, brick, ceramic, cloth, oil, coal, food, glass, plastic, etc. . . . . The types of materials can make up objects that are used within a given virtual world and the materials may vary based on application and/or design needs and goals. Example elements that are used within the virtual world may include: water, fire, impulse (e.g., physical force), electricity, warm air, wind, cold (or cold air), etc . . . .

As shown in the example state diagram in FIG. 3, an object that is at default state subjected to a water element will change state to "wet." However, if that same object had been subjected to a fire element, then it would change to a "burning" state.

In certain instances, when an object changes to a given state it may cause the object to generate or emit one or more types of elements. For example, when an object is in a burning state it may generate or emit a fire element and warm air.

In certain instances, the effects of certain elements may be used in connection with a physics engine for the game world. For example, wind and impulse elements may be used to apply a physical force to objects that are affected by those elements. Thus, if an explosive object changes to an explosion state it will cause the generation of an impulse element (and a fire element). This may be applied to other nearby virtual objects (e.g., as a physical force) and a physics engine may be used to calculate and/or otherwise control how the other virtual objects respond to these elements (or the physical effects of those elements).

In certain instances, an object must be of a specific material type for it to change state. An example of how different material types affect state changes include a frozen state only applying to living organisms (e.g., such as the player character or non-player characters). Thus, if cold is applied to the player character, then the player character may change to a frozen state (e.g., is turned to ice). However, if a cold element is applied to a wood object, then that element may have no effect on the associated object.

Another example is electricity. This element only causes a change of state if the object is an organism or metal. It should be noted for these states (the charged and leakage states) electricity is generated with more intensity in the leakage state (e.g., a discharge state) than in the charged state. In other words, more electricity is generated when an object is in a leakage state than in a charged state. But in both states electricity is being generated. Thus, it may be different in degree as opposed to element type.

In another example, a burning state may only apply to objects that are made out of wood, organisms, or explosives. In another example, an explosion state may only apply to objects that are made out of explosives. Setting up these foundational rules may thus allow the creation of more complex interactions within the virtual world—without having to rely upon specific pre-scripted events.

In certain instances, time may also play a role in changing the state of an object. For example, a player character that is frozen may only stay frozen for a certain amount of time before reverting back to a normal state. As another example, wood that is in a burning state may eventually change to a burnt out state (this is shown in the change of the tree object from FIG. 2C to FIG. 2D). The amount of time that is needed to change states may vary based on the type of material and/or the state change that may occur. For example, a player character may remain frozen for 5 seconds, a non-player character for 10 seconds, and a wood tree may burn for 30 seconds. Thus, time may affect objects that have different material types in different ways.

In certain instances, different elements (and/or time) can be used for the same state change transition for a given material. For example, fire, warm air, and/or wind can all be used to change an object from a wet state to a default or normal state. Furthermore, time may also change an object from a wet to normal state. For example, going from wet to normal may occur in 2 seconds for a fire element, 5 seconds for warm air, 10 seconds for wind, and 20 seconds for time.

In certain examples, state transitions may be instantaneous (or nearly so) and in other examples may occur after the given object has been in contact with (e.g., collided with) an element for a certain amount of time. Thus, for example, changing a wood object from a normal state to a burning state by using a fire element may occur after the wood object has been influenced by the fire element for 5 seconds. In another example, a metal object may change from normal to electrically charged immediately upon coming into contact with an electrical element.

As noted above, state transitions may occur due to multiple different elements. In certain examples, if two or more elements are affecting an object, the state transition may depend on the shorter duration of the two elements and/or may be further modified based on a combination of those elements. For example, warm air plus wind may reduce the transition time from burning to normal to 4 seconds (e.g., windy warm air being able to "dry" an object out more quickly than just warm air or just wind).

In certain example embodiments, multiple fire elements (e.g., being generated via a burning state of one wood object or multiple wood objects) may, in turn, generate a warm air element. This may cause, for example, an updraft effect (e.g., which may be used as input for a physics engine part of a game engine). A warm air element may also cause a general increase in temperature within the virtual world (e.g., with in the vicinity of the warm air element).

In certain examples, entire areas of a virtual world may be deemed to be in contact (e.g., adjacent or collided) with one or more elements. For example, an entire outdoor area of a virtual world may be rainy or an underground cavern may be filled with lava. In certain examples, this may be accomplished by designating certain areas or environment within the game world where any object therein is considered adjacent to one or more elements. Thus, when an object enters that area or is subject to certain environments, the game engine (e.g., the chemistry engine) may determine that the object is adjacent to the element that is associated with the given area or environment. Thus, those objects made out of materials (e.g., wood) that are affected by water may change their state to wet when it is raining (e.g., a rainy environment). Similarly, objects that are affected by fire may change their state to burning. However, certain objects that are not affected by the given element may not change states.

In certain examples, elements may cancel each other out. For example, a fire element (e.g., from a magic spell or the like) may cancel out a water element (and vice versa). In certain examples, whether an element cancels another element out may depend on the "strength" of that element. For example, throwing a bucket of water (an element) onto a large fire may not cancel out the effects of the fire. However, if it is rainy (e.g., where a larger amount of water may affect the fire), and the strength of the fire may be decreased (or extinguished).

In certain examples, the strength that an element is being generated may affect whether or not another element can change the state of an object. In the fire example, the "strength" or amount of the water element may be compared to the fire element being generated by logs of a campfire. Accordingly, the determination of whether or not the logs will transition to a normal state may be based on whether the fire strength is greater than the water strength. In certain examples, different element strengths may have different effects on other elements. For example, a fire element may be extinguished by a storm (e.g., a strong wind element), but may be increased in strength by a breeze (e.g., a weak wind element).

Figure 4:
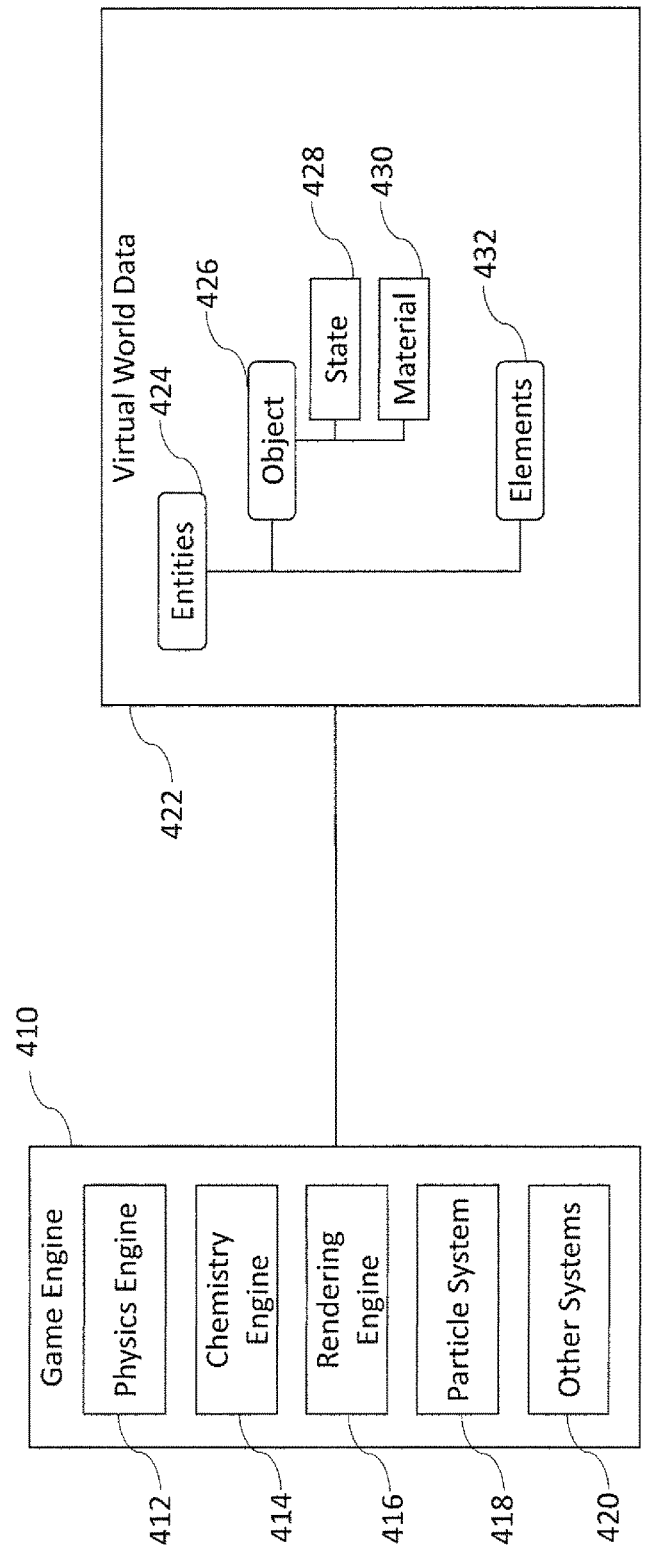
FIG. 4 is a function block diagram of a game engine and data used in generate a virtual world.

Description of FIG. 4:

FIG. 4 is a function block diagram of a virtual world engine and virtual world data used for generating a virtual world. An application program (e.g., one or more executable processes including, for example, linked libraries and other resources) can include a game engine 410. In certain examples, the game engine 410 may be a more general purpose virtual world engine.

Game engine 410 is a set of software routines that instructs a computer system (e.g., 600 in FIG. 6) on how to maintain, update, and/or generate a virtual world based on the resources and data that is provided to it. Examples of such resources may include model files or images created by artists, sound files, movies, stored data definitions (e.g., scripts), and the like. In general, the game engine 410 separates how a game is technically implemented on a computer system (e.g., how does a computer keep track of all the various "positions" of entities that exist within a virtual space) from those that design the game (e.g., how much health does a particular character have, where is a particular level located, what is the strength of this sword, etc. . . . ). In this regard, the game engine 410 can include one or more of the following subsystems or engines that handle different technical aspects of how a virtual world for a game may be created.

Physics engine 412 is a portion of the game engine 410 that handles how virtual objects physically interact with one another (e.g., in terms of movement and/or collisions). An example physics engine 412 is the Havok Engine.

Chemistry engine 414 is a portion of the game engine 410 that handles how different objects and elements within a virtual world may react to or interact with one another. As detailed herein, an example chemistry engine may operate using one or more rules. One rule may be that elements can change the state of objects. Another rule may be that elements can change each other's states. A further rule may be that objects cannot change each other's states. Other rules may also be added. The rules may be realized through, for example, a state transition graph or other data structure. One illustrative example is the state transition diagram shown in FIG. 3, which shows how objects and elements may interact.

Rendering engine 416 is a portion of the game engine 410 that handles transforming the internal representation of the virtual world into a visual representation. In the case of 3-dimentionsl virtual worlds, this can be accomplished using a virtual camera or the like. In the case of 2-dimensional virtual worlds, a sprite based rendering engine may be used.

Particle system 418 is a portion of the game engine that handles calculating (e.g., tracking, updating, simulating)

and/or representing (e.g., rendering) a large number of smaller virtual world entities. In certain examples, the particle system 418 may be used for representing fire and how the flames of a fire change. In certain examples, particle systems may be used to represent explosions or other similar effects.

Other systems 420 may also be included such as, for example, systems that handle networking, user input processing, graphical user interface rendering, etc. . . . .

The virtual world maintained and updated by the game engine 410 (and its various sub-engines) may operate with virtual world data 422. In certain examples, everything that is modeled and/or otherwise simulated within the virtual world may be defined as an entity 424. One example data structure is shown in FIG. 4. However, other types of data structures may also be used. For example, different entities may be initially defined with one or more materials. When a virtual world is created and objects for that world are allocated thereto, the objects are created based on the entity definitions. Accordingly, the instanced entities within the virtual world will be for a particular object (e.g., a certain sword or piece of armor) having the material property of whatever entity that object is an instance of. Each of the objects may then have a property for the current state of that object (e.g., burning, wet, etc. . . . ). Other attributes may also be associated with the object (e.g., a collision volume, location with the virtual world, etc. . . . ). In certain examples, elements are associated with at least one entity with the virtual world.

Different types of entities 424 may be included in the virtual world data 422. A first entity type may be objects 426. Example objects may include, weapons, armor, non-player characters, player characters. In certain examples, an object within the virtual world is made out of at least one type of "material." Example materials include: trees, rocks, metal, organic material, cloth, ceramic, glass, concrete, composites (e.g., a blend or combination of two or more materials), polymers or plastics, electronics, paper, and the like. In general, objects are those that hold a "solid" form. However, certain objects may not be solid. For example, an object that is made of jelly (a material) may be classified as an "object" (and thus influenced by elements). Thus, objects made out of "materials" that would not traditionally be "solids" may still be objects within the virtual world.

Objects 426 can have different parameters including the state of the object (e.g., whether it is burning, wet, etc. . . . ) and the type of material that the object is made out of. In certain examples, not every "object" has a corresponding material type. In other words, some objects in the virtual world may not have a material type not thus not be affected by state changes based on that information.

Another type of entity 424 are elements 432. In certain examples, element 432 may be tied to a particular object within the virtual world. For example, a fire element may be tied or linked to a log object (made of wood). In such instances, the generation of the fire element may be dependent on the log object being in a certain state (e.g., a burning state). Thus, if the log object transitions to, for example, a wet state from the burning state, then the chemistry engine (or other functionality) may delete the fire element that had been generated by the log object from the virtual world. In other examples, elements may exist independently of objects. For example, a wind element may be generated by a fan object (e.g., as shown in FIG. 1) and then the generated wind element may move independently through the virtual world.

Entities 424 (e.g., objects and/or elements) may also include other information, such as, for example, data on the mass, volume, speed, and the like. Entities may also be associated with a defined collision volume or area that is used by the physics engine 412 (or other sub routine of the game engine) to determine when one entity collides with another entity within the virtual world. Entities may also be associated with model and/or other data used for rendering the entity during the rendering process performed by the rendering engine 316.

Figure 5:
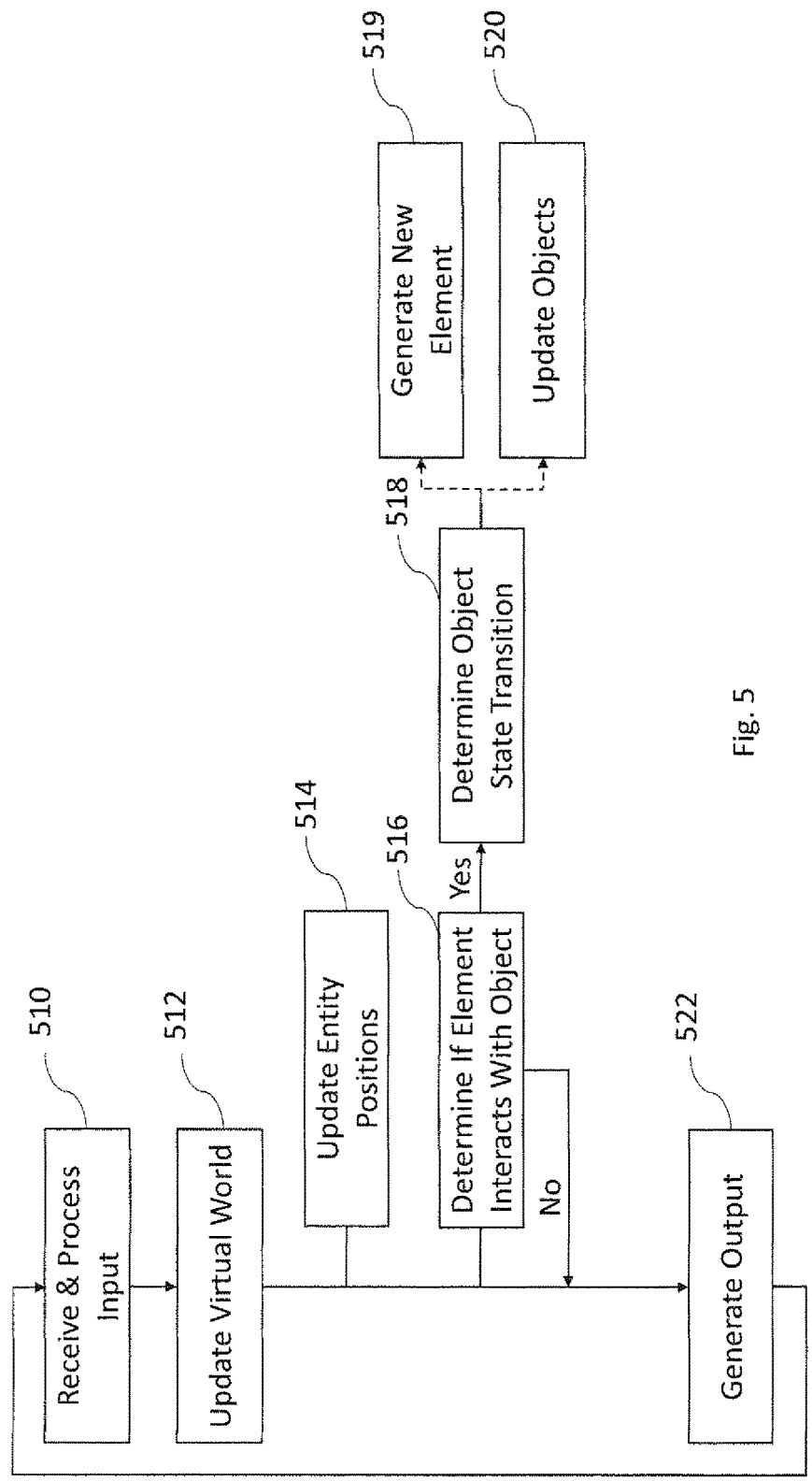
FIG. 5 is an example process diagram of a loop for how virtual world is created and updated.

Description of FIG. 5:

FIG. 5 is an example process diagram (e.g., a loop) for how virtual world is created and/or updated. Such a process may run as part of the game engine 410.

In 510, an executing computer program (e.g., a video game application) receives and processes input. This may include input provided by a local user (e.g., via a mouse, keyboard, a game controller, etc. . . . ) and/or input or updates received via a network connection (e.g., in the case of a multiplayer video game). That input is passed to the next step.

In 512, the process proceeds to update the virtual world based on the updates received in 510. 512 may include steps 514-520 as part of updating the virtual world. At 514, the positions and other data for entities within the virtual world are updated. This may include, for example, applying the entities against physics engine 412 and/or updating entities based on the inputs provided in 510.

At 516, the process determines if an element interacts with an object. This may include, for example, performing a collision detection process. In certain examples, the collision detection process determines if the collision area of an element intersects with the collision area of an object. In certain examples, the process may also determine if the collision area of two elements intersect with one another. In the case of a three-dimensional virtual space with multiple objects and elements therein, the collision process may include using bounding boxes, using space partitioning techniques, and the like. It will be appreciated that the techniques used in certain example collision processes may not determine if there is a strict "collision" between objects and/or elements. For example, the performed collision process may determine if one object is within a certain distance of another object. If the objects are within a certain distance of one another, then the game engine may determine that those objects have "collided" (and thus the process at 516 would return "Yes" a proceed to 518). Accordingly, the collision process may include performing determines of, for example, whether objects are adjacent to one another or whether they are within a certain distance of one another.

If there is a collision between an object and an element, then the chemistry engine 414 may determine, at 518, what affect (if any) that collision has on the state of the object and/or element. The determination may be made according to a state diagram or graph. The determination of how an element affects an object may include taking into account the type of material that makes up the object, the current state of the object, and/or the element type that is colliding with the object. To illustrate this aspect, returning briefly to FIGS. 2A-2H, the arrow in both examples is initially on fire (e.g., is generating a fire element). However, how the arrow object reacts to hitting the tree object depends on the state of the arrow object (in addition to the material type of the arrow object). Thus, in FIG. 2C, the fire from the arrow ignites the tree and in FIG. 2G the fire from the arrow changes the state of the tree to normal (and the arrow changes to burnt out.

Returning to FIG. 5, the results of the determination in 518 may be to, for example, generate a new element (519) and add it to the virtual world as a new entity (e.g., that is either associated with the object or not). For example, a fire element may be created by a log object being in a burning state. Alternatively, or in addition, objects may have their states updated (e.g., the log object transitioning from a normal to a burning state) based on the determination performed by the chemistry engine 414. Once the chemistry engine is finished updating the states of objects affected by the collision and/or the generation of new elements, then the process proceeds to 522.

In certain examples, the chemistry engine may run even though no collision occurs as certain state transitions are time dependent as opposed to dependent on collision with an element. In certain examples, an event engine may be used that causes events to be generated based on interactions between elements and/or objects. Such events may be used to determine when a timer has "expired" and a particular state transition should occur for an object.

Returning to 516 briefly, if there are no collisions detected then the process proceeds to 522.

At 522, the rendering engine performs a rendering process based on the updated virtual world data. Thus, for example, a virtual camera is located in the virtual space and used to generate an image of the virtual space.

At 522 sound and other information (e.g., network updates for remote players or the like) may also be generated at 522). This information is then output. The process then repeats by returning to 510. In certain examples, the process shown in FIG. 5 repeats 30 times a second (e.g., 30 FPS). In certain examples, the process of updating the virtual world (512) occurs at a different frequency than the process of generating the output (522), and/or the process of receiving and processing input (510).

Using these techniques, state transition determinations made in one execution of the process in FIG. 5 may affect other aspects of the virtual world in a succeeding executions. For example, an explosion may generate an impulse element within a certain radius of the explosion. This force may be applied to other objects within the virtual world in a subsequent execution of the game process (e.g., 1/30th of a second later). For example, the physics engine may apply the force to the objects to determine how they will move. The movement of the objects by the physics engine may then cause the generation of other elements (or bringing objects into contact with elements), that cause further state changes. Accordingly, various and interesting chain reactions can occur within the virtual world using these two systems. Such interactions may not be dependent on specific scripting within the game engine. This may beneficially provide increased enjoyment for a user interacting within the virtual world because the actions that a user can take are bound more closely to the user's imagination than the original designer of the virtual world.

Gameplay Examples:

As noted herein, changing the state of an object from normal to burning may depend on how long a fire element is in "contact" with the object or (how long the objects are in a collision state). It should be noted that determination of "contact" (or collision) is a determination made by the game engine and can include situations where the object and element are adjacent or near to one another within the virtual world. For example, while the element and object may not be visually in contact with one another to the eyes of a game player (e.g., in the image presented on a display), they may be in "contact" within the virtual world. For example, an element and an object may be 1 foot apart within the virtual space, but game engine may have determined that this is a collision/contact between the two objects (e.g., because the bounding areas of the object and/or elements have intersected, etc. . . . )

In certain examples, the chemistry engine 414 may change how states are handled based on the type of interaction or situation that a user is in. For example, whether or not the player character is in a "battle" with another NPC may affect how the state transitions are handled.

In certain examples, virtual game world is provided where a user controls a player character. Located throughout the virtual game world are different non-player characters or monsters that the player character can fight. In certain examples, when the player character is determined to be within a certain distance a monster the game changes into a battle mode (e.g., a mode that causes different timings for elements to apply to objects). In certain examples, a battle mode is entered when the player character takes an aggressive action against a non-player character (e.g. shooting an arrow) even if the player character is outside of the default range. In certain examples, a battle mode may trigged when an object is determined to have collided with an element at more than a predetermined speed. This may be a speed associated with the object and/or a speed that is relative to the object (e.g., the element is "moving" instead of the object).

In certain example embodiments, a battle mode may be triggered if an element is used in an offensive action (e.g., entered an offense mode) taken by the player-character. In other words, while a "battle" may not of started from the perspective of both objects that exist within the virtual world. A player character's (or NPCs) actions alone may trigger the battle mode. For example, when the player character swings a sword or shoots an arrow these may be classified as offensive actions that trigger a battle mode and thus how the elements associated with those objects (the sword or arrow) affect other objects may be changed (e.g., so the effects are immediate). Another example of a situation that may satisfy the immediate condition is when a player casts a magic spell (e.g., a fireball). Thus, the element does not need to be associated with a particular object (such as a sword or arrow), but instead may be generated by the player character or NPC (e.g., in the form of a spell or the like).

When a battle mode is initiated within the game, the time restriction for changing the state of objects based on contact with a fire element may be changed to be immediate. Thus, for example, if a player character swings a fiery weapon at a monster and the monster blocks with a wooden shield, the shield will then catch fire immediately. In this scenario, while the shield may protect the defending monster (e.g., the monster suffers no damage), the shield may still catch fire. Once the shield is on fire, it is possible that the defending monster may catch on fire after a person of time has passed and/or the shield may burn up (e.g., be reduced to ash). Accordingly, even if the monster successfully blocks with their shield, they may still catch fire as a result.

If the fiery weapon hits the monster (e.g., the monster's defense is not successful), then the defending monster may be set on fire (e.g., immediately). The shield may also catch fire after a certain amount of the time (e.g. not immediately) of the monster being on fire.

In certain example embodiments, an electrically charged weapon (e.g., an object with an electrical element) that hits a metal shield may cause the metal shield to charge. In certain examples, the monster (or player character) holding the metal shield may then be shocked because their shield has been electrically charged. However, if a wooden shield had been used then no electrical change would have been passed to the shield.

In certain examples, player characters and/or non-player characters may not be subject to the effects of the elements being generated by virtual objects held by those characters. Thus, in certain examples, if a player character is holding a sword that is generating an element (e.g., fire), then the element being generated from the sword may not affect the player character. However, if the same element from another source comes into contact with the player character, then that element may affect the player.

In certain examples, objects may have additional type information that affects how quickly elements affect them. For example, the above discussed implementation may be only applicable if the object being used is classified as a weapon (e.g., a sword, arrow, etc. . . . ) or a shield. Thus, if the monster character walks through a camp fire during a battle mode with the player character, the original default time aspect to catching fire may still apply. Also, in certain examples, the fire element from the logs fire may not apply immediately because that instance of the fire element it is not associated with an offensive action (e.g., it is not "in" a battle).

In certain examples, elements that are under control of a non-player character may not affect the other objects outside of the battle mode. Thus, if a monster drops a torch onto dry grass outside of the battle mode, it will not cause a fire to spread.

In certain examples, weapons that are wielded during a battle are unaffected by elements associated with other weapons. Thus, if a fiery weapon held by one character (e.g., a virtual world object) and another regular weapon held by another character (e.g., another virtual world object) collide in battle, the regular weapon will not become a fire weapon.

In one example, a box (an object) made of a wood material (e.g., a wooden box) is located in a virtual world. The game engine may determine that the wooden box has collided with a fire element. In response to this collision, the state of the wooden box turns to a burning state. This state change is correspondingly animated and visually (and/or audibly) delivered to the user. The wooden box is also set to generate a fire element. Accordingly, a new fire element entity may be added to the virtual world, with a corresponding collision area that encompasses or surrounds the wooden box object. In certain examples, this "new" fire element instance is dependent on: 1) the box object; and 2) the box object remaining in the burning state. In certain examples, the element that is generated may be the same "type" as the element that initially collided with the box or may be a different type. For example, a water element that is applied to an object that is in an electrically charged state may cause and electrical discharge. In certain examples, the generation of the "new" element creates a new element that is not dependent (e.g., attached to) the object that caused the generation of that element. For example, impulse (a force) that is generated from explosives entering an explosive state may affect other objects after the explosive object expires.

In another example, a wood box object that is in a burning state collides with a water element (e.g., a river or the like) in the virtual world. In response to this collision, the state of the wooden box goes from burning to wet. Further, as the wooden box is no longer in the burning state, the fire element instance that was emanating from the box is deleted and/or abandoned. This is correspondingly presented to the user (e.g., the fire element disappears).

In certain example embodiments, a state that an object may enter may be a stasis state. In this state, the object may be frozen in time. When in this state, any action performed on that object may be queued up and then applied when the stasis state wears off (e.g., after 2 seconds, 5 seconds, or another determined time period). In certain examples, this may include storing kinetic energy that is applied to the object (e.g., whether through hitting the object or subjecting it to some other force). When the stasis wears off the energy that has been stored up over the stasis time may be released immediately (thus causing interesting effects within the virtual world). The force applied to the object in this manner may be handled by a physics engine.

Figure 6:
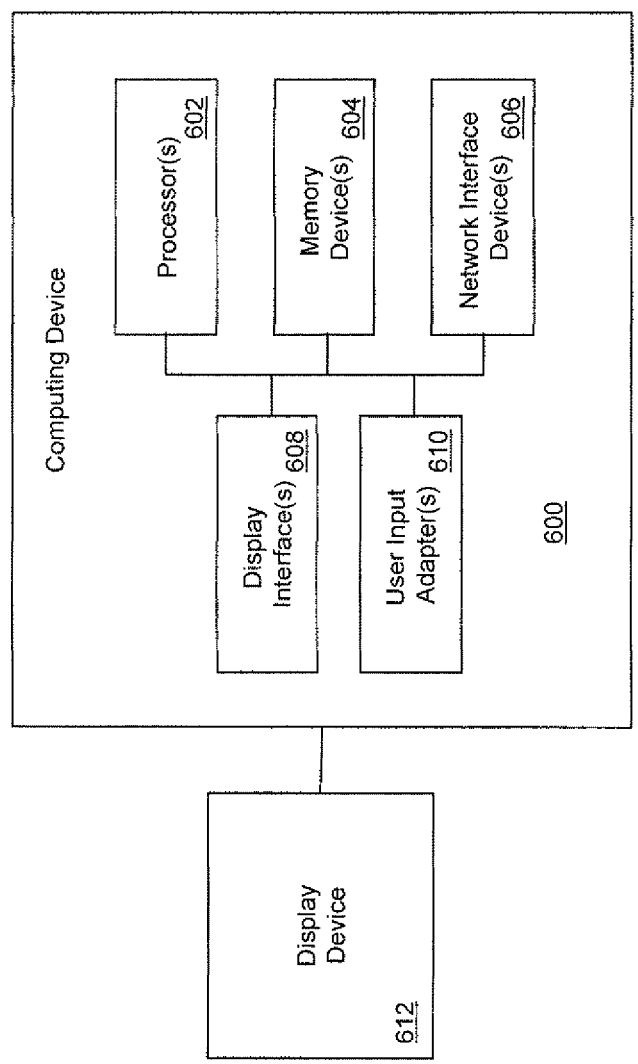
FIG. 6 is a block diagram of an example computer system that may be used on connection with certain example embodiments.

Description of FIG. 6:

FIG. 6 is a block diagram of an example computing device 600 (which may also be referred to, for example, as a "computing device," "computer system," or "computing system") according to some embodiments. In some embodiments, the computing device 600 includes one or more of the following: one or more processors 602; one or more memory devices 604; one or more network interface devices 606; one or more display interfaces 608; and one or more user input adapters 610. Additionally, in some embodiments, the computing device 600 is connected to or includes a display device 612. As will explained below, these elements (e.g., the processors 602, memory devices 604, network interface devices 606, display interfaces 608, user input adapters 610, display device 612) are hardware devices (for example, electronic circuits or combinations of circuits) that are configured to perform various different functions for the computing device 600.

In some embodiments, each or any of the processors 602 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 602 uses an instruction set architecture such as x86 or Advanced RISC Machine (ARM).

In some embodiments, each or any of the memory devices 604 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 602). Memory devices 604 are examples of non-volatile computer-readable storage media.

In some embodiments, each or any of the network interface devices 606 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 608 is or includes one or more circuits that receive data from the processors 602, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 612, which displays the image data. Alternatively or additionally, in some embodiments, each or any of the display interfaces 608 is or includes, for example, a video card, video adapter, or graphics processing unit (GPU).

In some embodiments, each or any of the user input adapters 610 is or includes one or more circuits that receive and process user input data from one or more user input devices (not shown in FIG. 6) that are included in, attached to, or otherwise in communication with the computing device 600, and that output data based on the received input data to the processors 602. Alternatively or additionally, in some embodiments each or any of the user input adapters 610 is or includes, for example, a PS/2 interface, a USB interface, a touchscreen controller, or the like; and/or the user input adapters 610 facilitates input from user input devices (not shown in FIG. 6) such as, for example, a keyboard, mouse, trackpad, touchscreen, and the input devices discussed in U.S. Publication No. 2016/0361641, etc . . . .

In some embodiments, the display device 612 may be a Liquid Crystal Display (LCD) display, Light Emitting Diode (LED) display, or other type of display device. In embodiments where the display device 612 is a component of the computing device 600 (e.g., the computing device and the display device are included in a unified housing), the display device 612 may be a touchscreen display or non-touchscreen display. In embodiments where the display device 612 is connected to the computing device 600 (e.g., is external to the computing device 600 and communicates with the computing device 600 via a wire and/or via wireless communication technology), the display device 612 is, for example, an external monitor, projector, television, display screen, etc. . . . . In certain examples, two more displays may be used. In certain examples, a computing device that includes an integrated display may also use an external display (e.g., television0.

In various embodiments, the computing device 600 includes one, or two, or three, four, or more of each or any of the above-mentioned elements (e.g., the processors 602, memory devices 604, network interface devices 606, display interfaces 608, and user input adapters 610). Alternatively or additionally, in some embodiments, the computing device 600 includes one or more of: a processing system that includes the processors 602; a memory or storage system that includes the memory devices 604; and a network interface system that includes the network interface devices 606.

The computing device 600 may be arranged, in various embodiments, in many different ways. As just one example, the computing device 600 may be arranged such that the processors 602 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 600 may be arranged such that: the processors 602 include two, three, four, five, or more multi-core processors; the network interface devices 606 include a first network interface device that implements Ethernet and a second network interface device that implements WiFi and/or Bluetooth; and the memory devices 604 include a RAM and a flash memory or hard disk.

As previously noted, whenever it is described in this document that a software module, "engine," or software process performs any action, the action is in actuality performed by underlying hardware elements according to the instructions that comprise the software module. Consistent with the foregoing, in various embodiments, each or any combination of the game engine 410, physics engine 412, chemistry engine 414, rendering engine 416, particle system 418, other systems 410, computing device 140, each of which will be referred to individually for clarity as a "component" for the remainder of this paragraph, are implemented using an example of the computing device 600 of FIG. 5. In such embodiments, the following applies for each component: (a) the elements of the 600 computing device 600 shown in FIG. 6 (i.e., the one or more processors 602, one or more memory devices 604, one or more network interface devices 606, one or more display interfaces 608, and one or more user input adapters 610), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 604 (e.g., in various embodiments, in a volatile memory device such as a RAM or an instruction register and/or in a non-volatile memory device such as a flash memory or hard disk) and all actions described herein as performed by the software modules are performed by the processors 602 in conjunction with, as appropriate, the other elements in and/or connected to the computing device 600 (i.e., the network interface devices 606, display interfaces 608, user input adapters 610, and/or display device 612); (c) alternatively or additionally, to the extent it is described herein that the component processes and/or otherwise handles data, in some embodiments, such data is stored in the memory devices 604 (e.g., in some embodiments, in a volatile memory device such as a RAM and/or in a non-volatile memory device such as a flash memory or hard disk) and/or is processed/handled by the processors 602 in conjunction, as appropriate, the other elements in and/or connected to the computing device 600 (i.e., the network interface devices 606, display interfaces 608, user input adapters 610, and/or display device 512); (d) alternatively or additionally, in some embodiments, the memory devices 602 store instructions that, when executed by the processors 602, cause the processors 602 to perform, in conjunction with, as appropriate, the other elements in and/or connected to the computing device 600 (i.e., the memory devices 604, network interface devices 606, display interfaces 608, user input adapters 610, and/or display device 512), each or any combination of actions described herein as performed by the component and/or by any software modules described herein as included within the component.

Consistent with the preceding paragraph, as one example, in an embodiment where an instance of the computing device 600 is used to implement game engine 410, the memory devices 604 could load the files associated with the virtual world data 422, and/or store the data described herein as processed and/or otherwise handled by the game engine 410. Processors 602 could be used to operate the game engine 410, physics engine 412, Chemistry engine 414, rendering engine 416, particle system 418, and other systems 420. In certain examples, different discrete hardware processors may be used for handling the functions associated with the components discussed herein. For example, the rendering engine may use processors from the GPU while the chemistry engine may use a CPU.

The hardware configurations shown in FIG. 6 and described above are provided as examples, and the subject matter described herein may be utilized in conjunction with a variety of different hardware architectures and elements. For example, the hardware architecture shown in U.S. 2016/0361641 may be used. Further, in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 6, (e) via other hardware arrangements, architectures, and configurations, and/or via combinations of the technology described in (a) through (e).

Technical Advantages of Described Subject Matter

In certain example embodiments, the techniques described herein facilitate so-called emergent gameplay (or more generally emergent virtual interactions)—the ability to create complex situations in a game (or other virtual space) through a foundational rules or processing. In other words, according to certain examples herein, techniques are described that do not rely on complex scripting. Instead, the techniques create situations in a virtual world that allow players to find creative solutions to certain problems presented with the virtual world.

In certain examples, a virtual game environment is provided in which physical/movement systems are modeled using a physics engine and a chemistry engine is used to control when and/or how different objects within the virtual game environment change between states. These techniques allow for new and interesting types of emergent user experiences in virtual game environments.

In certain example embodiments, complex and flexible virtual world interaction are provided via, for example, a chemistry engine and/or physics engine. These interactions allow for so-called multiplicative gameplay. In other words, when user is playing a game they are presented with a variety of situations that have a corresponding overriding "goal" for each of those situations. For example, the game character is on one side of a canyon (the situation) and needs to get to the other (the goal) to proceed. Multiplicative gameplay may refer to allowing a variety of different possible player actions in combination with the game field presented to the user and the objects within the virtual space made available to the user. These three elements may be "multiplied" together to give a vast variety of different options for proceeding. Because of this multiplicative effect a relatively small number of objects (e.g., 5), player actions (e.g., 5), and design of a game field (e.g., the existence of the canyon) may be used in many different ways to create 10s or 100s of different possible options for achieving the goal.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. . . . is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 3-5, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
    a memory device configured to store:
        data for a plurality of virtual objects that are located within a virtual space, each one of the plurality of virtual objects having a current state, the plurality of virtual objects including a first virtual object and a second virtual object, and
        data for a plurality of elements that are located within the virtual space, each one of the plurality of elements being one of a plurality of different element types, the plurality of elements including a first element;
    a processing system that includes at least one hardware processor, the processing system configured to:
        execute a video game that includes the virtual space in which the plurality of virtual objects are located,
        perform a collision detection process to determine whether at least the first element has collided with the first virtual object,
        in response to determination of collision between the first element and the first virtual object, determine, based on at least the current state of the first object in a virtual space and the element type of the first element, whether the first element affects the first virtual object,
        based on the determination that the first element affects the first virtual object, change the current state of the first virtual object to a second state that is different from the current state,
        as part of a chain reaction between elements and virtual objects within the virtual space and in response to changing the first virtual object to the second state, generate a second element of the plurality of elements that subsequently causes a change in state of at least the second virtual object within the virtual space, wherein the change in state of the second virtual object is different than the change in state of the first virtual object that was affected by the first element, and
        generate images of the virtual space and output those generated images to a display device.

2. The computer system of claim 1, wherein interactions, which do not involve the first or second element, that occur between the first virtual object and the second virtual object within the virtual space do not trigger a change in state of the respective virtual object(s).

3. The computer system of claim 1, wherein the processing system is further configured to:
    based on a prior determination that the first element affects the first virtual object, change a prior state of the first virtual object to the current state, wherein the prior state is different from the current state and the second state.

4. The computer system of claim 1, wherein the processing system is further configured to:
    track a first condition of the virtual space and a second condition of the virtual space; and
    track an amount of time that the first element has collided with the first virtual object,
    wherein the determination of whether the first element affects the first virtual object is further based on the tracked amount of time against a time threshold amount, wherein the time threshold amount is lower under the first condition than the second condition.

5. The computer system of claim 4, wherein the first condition is set based on a determination that the first virtual object is within a predetermined distance of another virtual object that is of a certain type within the virtual space.

6. The computer system of claim 4, wherein the first condition is set based on a determination that the first object is used in a battle that occurs within the virtual space.

7. The computer system of claim 4, wherein the first condition is set based on a determination that the first virtual object has collided with first element at more than a predetermined speed within the virtual space.

8. The computer system of claim 1, wherein the processing system is further configured to:
    generate a third element from a plurality of the second elements, wherein the third element is different from the plurality of the second elements.

9. The computer system of claim 2, wherein the processing system is further configured to:
    change, based on a determination that a third element affects the first virtual object in the second state, the first virtual object to a third state that is different from the current state and the second state,
    in response to changing the first virtual object to the third state, generate the second element of the plurality of elements with an intensity that is greater than when the first virtual object was in the second state.

10. The computer system of claim 9, wherein the third element is a water element, the second state is an electrically charged state and the third state is an electrical discharge.

11. The computer system of claim 1, wherein the plurality of elements includes a third element and the processing system is further configured to:
    apply the third element over an area of the virtual space such that all virtual objects of the plurality of virtual objects within the area are considered adjacent to the third element.

12. A method of rendering a virtual world on a computer system that includes at least one memory device and at least one hardware processor, the method comprising:
    processing, as part of a video game, a virtual world that includes a plurality of virtual objects that are located within the virtual world, each one of the plurality of virtual objects having a current state, the plurality of virtual objects including a first virtual object and a second virtual object;
    processing a plurality of elements that are located within the virtual world, each one of the plurality of elements being one of a plurality of different element types, the plurality of elements including a first element;

performing a collision detection process to determine whether at least the first element has collided with the first virtual object;

in response to determination of collision between the first element and the first virtual object, determining, based on at least the current state of the first object in a virtual world and the element type of the first element, whether the first element affects the first virtual object;

based on the determination that the first element affects the first virtual object, changing the current state of the first virtual object to a second state that is different from the current state;

as part of a chain reaction between elements and virtual objects within the virtual space and in response to changing the first virtual object to the second state, generate a second element of the plurality of elements that subsequently causes a change in state of at least the second virtual object within the virtual space, wherein the change in state of the second virtual object is different than the change in state of the first virtual object that was affected by the first element; and rendering images of the virtual world and outputting those rendered images to a display device.

13. The method of claim 12, wherein interactions, which do not involve the first or second element, that occur between the first virtual object and the second virtual object within the virtual space do not cause a change in state of the respective virtual object(s).

14. The method of claim 13, wherein, continued generation of the second element is based on the first virtual object continuing to be in the second state.

15. A non-transitory computer readable storage medium storing computer executable instructions thereon for use with a computer system that includes a memory device and at least one hardware processor, the store computer executable instructions comprising instructions that cause the at least one hardware processor to:

process, as part of a video game being executed, a virtual world that includes a plurality of virtual objects that are located within the virtual world, each one of the plurality of virtual objects having a current state, the plurality of virtual objects including a first virtual object and a second virtual object;

process a plurality of elements that are located within the virtual world, each one of the plurality of elements being one of a plurality of different element types, the plurality of elements including a first element;

perform a collision detection process to determine whether at least the first element has collided with the first virtual object;

in response to determination of collision between the first element and the first virtual object, determine, based on at least the current state of the first object in the virtual world and the element type of the first element, whether the first element affects the first virtual object;

based on the determination that the first element affects the first virtual object, change the current state of the first virtual object to a second state that is different from the current state;

as part of a chain reaction between elements and virtual objects within the virtual space and in response to changing the first virtual object to the second state, generate a second element of the plurality of elements that subsequently causes a change in state of at least the second virtual object within the virtual space, wherein the change in state of the second virtual object is different than the change in state of the first virtual object that was affected by the first element; and render images of the virtual world and output those rendered images to a display device.

16. The non-transitory computer readable storage medium of claim 15, wherein interactions, which do not involve the first or second element, that occur between the first virtual object and the second virtual object within the virtual space do not trigger a change in state of the respective virtual object(s).

17. The non-transitory computer readable storage medium of claim 15, wherein the stored instructions further comprise instructions that cause the at least one hardware processor to:

generate a third element from a plurality of the second elements, wherein the third element is different from the plurality of the second elements.

18. A computer device comprising:

a processing system that includes at least one hardware processor, the processing system configured to:

process a virtual world to locate a plurality of virtual objects therein, each one of the plurality of virtual objects having a current state, the plurality of virtual objects including a first virtual object and a second virtual object;

process a plurality of elements that are located within the virtual world, each one of the plurality of elements being one of a plurality of different element types, the plurality of elements including a first element;

determine, based on at least the current state of the first object in the virtual world and the element type of the first element, whether the first element affects the first virtual object;

based on the determination that the first element affects the first virtual object, change the current state of the first virtual object to a second state that is different from the current state;

as part of a chain reaction between elements and virtual objects within the virtual space and in response to changing the first virtual object to the second state, generate a second element of the plurality of elements that subsequently causes a change in state of at least the second virtual object within the virtual space, wherein the change in state of the second virtual object is different than the change in state of the first virtual object that was affected by the first element; and generate images of the virtual space and cause the generated images to be output to a display device.

19. The computer device of claim 18, wherein the processing system is further configured to:

link the generated second element to the first virtual object; and in response to changing the first virtual object to another state that is not the second state, delete the second element from the virtual world.

20. The computer device of claim 18, wherein the processing system is further configured to:

based on a prior determination that the first element affects the first virtual object, change a prior state of the first virtual object to the current state, wherein the prior state is different from the current state and the second state.

* * * * *